(12) United States Patent
Zhang et al.

(10) Patent No.: US 11,836,021 B2
(45) Date of Patent: Dec. 5, 2023

(54) SERIAL FLUIDIC FLOW LOOP IN LIQUID-ASSISTED AIR COOLED THERMAL CONTROL SYSTEM

(71) Applicant: Dell Products L.P., Round Rock, TX (US)

(72) Inventors: Mingming Zhang, Shanghai (CN); Chengyi Gu, Dalian (CN); Jie Yang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 51 days.

(21) Appl. No.: 17/502,136

(22) Filed: Oct. 15, 2021

(65) Prior Publication Data

US 2023/0092139 A1 Mar. 23, 2023

(30) Foreign Application Priority Data

Sep. 23, 2021 (CN) .......................... 202111118202.2

(51) Int. Cl.
*G06F 1/20* (2006.01)
*F28D 7/16* (2006.01)
*G05B 15/02* (2006.01)

(52) U.S. Cl.
CPC ............... *G06F 1/206* (2013.01); *F28D 7/16* (2013.01); *G05B 15/02* (2013.01); *G06F 2200/201* (2013.01)

(58) Field of Classification Search
CPC ..................................................... G06F 1/206
See application file for complete search history.

(56) References Cited

U.S. PATENT DOCUMENTS

| | | | |
|---|---|---|---|
| 10,512,193 B1 * | 12/2019 | Chen | H05K 7/20781 |
| 2004/0114324 A1 * | 6/2004 | Kusaka | G06F 1/203 361/699 |
| 2007/0133174 A1 * | 6/2007 | Mikami | H01L 23/427 257/E23.114 |
| 2012/0024501 A1 * | 2/2012 | Campbell | H05K 7/20236 165/104.33 |
| 2017/0177041 A1 * | 6/2017 | Shelnutt | H05K 7/20809 |
| 2020/0042052 A1 * | 2/2020 | Shabbir | H05K 7/20809 |
| 2020/0103307 A1 * | 4/2020 | Farkas | H05K 7/20218 |
| 2021/0278093 A1 * | 9/2021 | Green | F24D 3/02 |

* cited by examiner

*Primary Examiner* — Suresh Suryawanshi
(74) *Attorney, Agent, or Firm* — Jackson Walker L.L.P

(57) ABSTRACT

Systems and methods may provide for a serial fluidic flow loop in a liquid-assisted air cooled thermal control system, in order to balance thermal gradients in the thermal control system.

15 Claims, 2 Drawing Sheets

SERIAL FLUIDIC FLOW LOOP IN LIQUID-ASSISTED AIR COOLED THERMAL CONTROL SYSTEM

TECHNICAL FIELD

The present disclosure relates in general to information handling systems, and more particularly to liquid-assisted air-cooled thermal control systems in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

To control temperature of components of an information handling system, an air mover may direct air over one or more heatsinks thermally coupled to individual components. Traditional approaches to cooling components may include a "passive" cooling system that serves to reject heat of a component to air driven by one or more system-level air movers (e.g., fans) for cooling multiple components of an information handling system in addition to the peripheral component. Another traditional approach may include an "active" cooling system that uses liquid cooling, in which a heat-exchanging cold plate is thermally coupled to the component, and a chilled fluid is passed through conduits internal to the cold plate to remove heat from the component.

FIG. 1 illustrates an information handling system 102 comprising a liquid-assisted air-cooled thermal control system 118, as is known in the art. As shown in FIG. 1, information handling system 102 may include one or more processors 103, one or more memory modules 104, and liquid-assisted air-cooled thermal control system 118. Further, as shown in FIG. 1, liquid-assisted air-cooled thermal control system 118 may include one or more air movers 108, heat-rejecting media 122, fluidic conduits 126, cold manifold 128, hot manifold 130, and radiator 132.

As shown in FIG. 1, liquid-assisted air-cooled thermal control system 118 may be arranged in a parallel configuration, in that cooled liquid may be delivered from radiator 132 to cold manifold 128, from where the cooled liquid may be distributed in parallel to both heat-rejecting media 122 (e.g., cold plates thermally coupled to respective processors 103). Accordingly, heat generated by processors 103 may be transferred to their respective heat-rejecting media 122, and from the heat-rejecting media 122 to the liquid. The liquid, now heated by heat transfer from processors 103, may flow to hot manifold 130 and to radiator 132. Air driven proximate to radiator 132 by air movers 108 may cool the liquid, which may re-emerge as cooled liquid flowing into cold manifold 128, forming a liquid cooling loop.

While processors 103 may be cooled mainly through liquid cooling, other components of information handling system 102, such as memory modules 104, may be cooled entirely by airflow driven by air movers 108. However, the arrangement of FIG. 1 has disadvantages with respect to cooling of downstream components. To illustrate, because of the temperature gradient across radiator 132 from the left side of FIG. 1 to the right side of FIG. 1, air passing over the left of radiator 132 may be warmed more than the air passing over the right of radiator 132. Accordingly, as such airflow continues downward in FIG. 1, a temperature of air being driven proximate to the memory module 104 on the left of FIG. 1 may be warmer than a temperature of air being driven proximate to the memory module 104 on the right of FIG. 1.

Another disadvantage of liquid-assisted air-cooled thermal control system 118 depicted in FIG. 1 is that the liquid cooling loop comprises two triple valves with fluidic conduits 126, which may require additional welding or other fluidic connectivity (which may lead to lower reliability) and may present a large liquid flow impedance.

A further disadvantage of the liquid-assisted air-cooled thermal control system 118 depicted in FIG. 1 is, due to the parallel routing of fluidic conduits 126, processors 103 may see non-uniform thermal performance on account of uneven liquid flow distribution to heat-rejecting media 122.

SUMMARY

In accordance with the teachings of the present disclosure, the disadvantages and problems associated with existing designs of thermal control systems for information handling system may be substantially reduced or eliminated.

In accordance with embodiments of the present disclosure, an information handling system may include a plurality of information handling resources comprising at least a first information handling resource and a second information handling resource and a thermal control system. The thermal control system may include one or more air movers, first heat-rejecting media thermally coupled to the first information handling resource, the first heat-rejecting media configured to receive a flow of cooling fluid through the first heat-rejecting media, second heat-rejecting media thermally coupled to the second information handling resource, the second heat-rejecting media configured to receive the flow of cooling fluid through the second heat-rejecting media, a first heat exchanger fluidically coupled to the first heat-rejecting media and located such that airflow driven by the one or more air movers flows proximate to the first heat exchanger, and a second heat exchanger fluidically coupled to the second heat-rejecting media and located such that airflow driven by the one or more air movers flows proximate to the second heat exchanger. Components of the thermal control system may be arranged such that the cooling fluid flows from the first heat exchanger to the first heat-rejecting media, from the first heat-rejecting media to the second heat exchanger, from the second heat exchanger to the second heat-rejecting media, and from the second heat-rejecting media to the first heat exchanger. The first heat exchanger and the second heat exchanger may be arranged relative to one another and relative to the one or more air movers such that as a result of mirrored thermal gradients across the first heat exchanger and the second heat exchanger, airflow driven by the one or more air movers proximate to the first heat exchanger and the second heat exchanger is of approximately uniform temperature once driven past the first heat exchanger and the second heat exchanger.

In accordance with these and other embodiments of the present disclosure, a thermal control system may include first heat-rejecting media configured to thermally couple to a first information handling resource, the first heat-rejecting media further configured to receive a flow of cooling fluid through the first heat-rejecting media, second heat-rejecting media configured to thermally couple to a second information handling resource, the second heat-rejecting media further configured to receive the flow of cooling fluid through the second heat-rejecting media, a first heat exchanger fluidically coupled to the first heat-rejecting media and located such that airflow driven by one or more air movers flows proximate to the first heat exchanger, and a second heat exchanger fluidically coupled to the second heat-rejecting media and located such that airflow driven by the one or more air movers flows proximate to the second heat exchanger. Components of the thermal control system may be arranged such that the cooling fluid flows from the first heat exchanger to the first heat-rejecting media, from the first heat-rejecting media to the second heat exchanger, from the second heat exchanger to the second heat-rejecting media, and from the second heat-rejecting media to the first heat exchanger. The first heat exchanger and the second heat exchanger may be arranged relative to one another and relative to the one or more air movers such that as a result of mirrored thermal gradients across the first heat exchanger and the second heat exchanger, airflow driven by the one or more air movers proximate to the first heat exchanger and the second heat exchanger is of approximately uniform temperature once driven past the first heat exchanger and the second heat exchanger.

In accordance with these and other embodiments of the present disclosure, a method may include fluidically coupling a first heat exchanger to first heat-rejecting media and locating the first heat exchanger such that airflow driven by one or more air movers flows proximate to the first heat exchanger, wherein the first heat-rejecting media is configured to thermally couple to a first information handling resource and is configured to receive a flow of cooling fluid through the first heat-rejecting media, fluidically coupling a second heat exchanger to second heat-rejecting media and locating the second heat exchanger such that airflow driven by the one or more air movers flows proximate to the second heat exchanger, wherein the second heat-rejecting media is configured to thermally couple to the a second information handling resource and is configured to receive a flow of cooling fluid through the second heat-rejecting media, arranging components of a thermal control system such that the cooling fluid flows from the first heat exchanger to the first heat-rejecting media, from the first heat-rejecting media to the second heat exchanger, from the second heat exchanger to the second heat-rejecting media, and from the second heat-rejecting media to the first heat exchanger, and arranging the first heat exchanger and the second heat exchanger relative to one another and relative to the one or more air movers such that as a result of mirrored thermal gradients across the first heat exchanger and the second heat exchanger, airflow driven by the one or more air movers proximate to the first heat exchanger and the second heat exchanger is of approximately uniform temperature once driven past the first heat exchanger and the second heat exchanger.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 2:
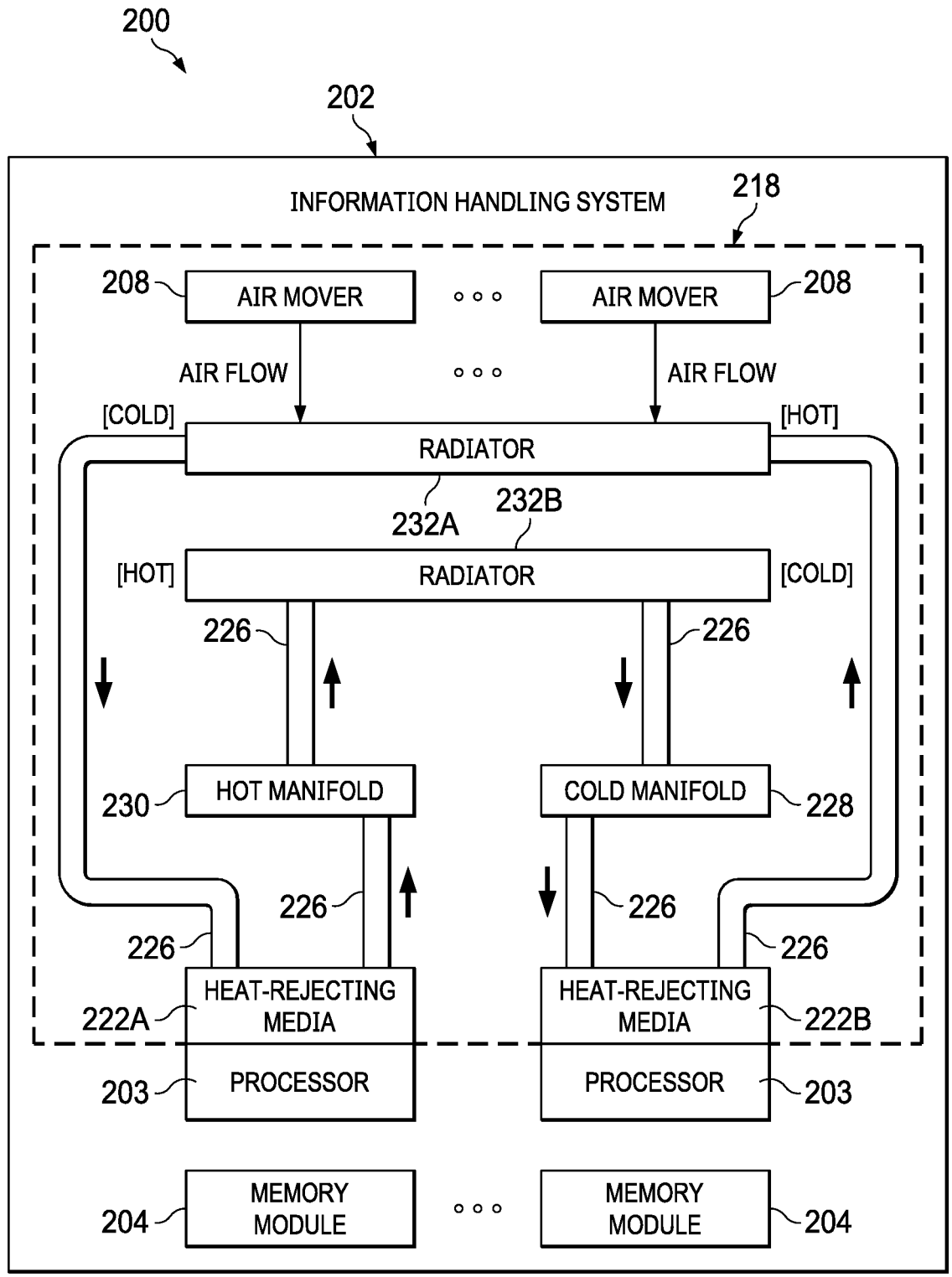
FIG. 2 illustrates a block diagram of an example information handling system, in accordance with embodiments of the present disclosure.

Preferred embodiments and their advantages are best understood by reference to FIG. 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 2 illustrates a block diagram of an example information handling system 202, in accordance with embodiments of the present disclosure. In some embodiments, information handling system 202 may comprise a server or "blade" configured to be housed along with a plurality of other servers or "blades" within a rack, tower, or other enclosure. In other embodiments, information handling system 202 may comprise a personal computer (e.g., a desktop computer, laptop computer, mobile computer, and/or notebook computer). In yet other embodiments, information handling system 202 may be a storage appliance integral to a storage enclosure configured to house a plurality of physical disk drives and/or other computer-readable media for storing data. As shown in FIG. 2, information handling system 202 may include a plurality of processors 203, a plurality of memory modules 204, and a liquid-assisted air-cooled thermal control system 218.

A processor 203 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, a processor 203 may interpret and/or execute program instructions and/or process data stored in memory modules 204 and/or another component of information handling system 202.

A memory module 204 may be communicatively coupled to one or more processors 203 and may comprise any system, device, or apparatus operable to retain program instructions or data for a period of time. A memory modules 204 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 202 is turned off. In some embodiments, a memory module 204 may comprise a dual inline memory module (DIMM) or other similar memory module.

As shown in FIG. 2, liquid-assisted air-cooled thermal control system 218 may include one or more air movers 208, heat-rejecting media 222 (e.g., heat-rejecting media 222A and 222B) each thermally coupled to a respective processor 203, fluidic conduits 226, cold manifold 228, hot manifold 230, and a plurality of radiators 232 (e.g., radiators 232A and 232B).

An air mover 208 may include any mechanical or electro-mechanical system, apparatus, or device operable to move air and/or other gases in order to cool information handling resources of information handling system 202. In some embodiments, air mover 208 may comprise a fan (e.g., a rotating arrangement of vanes or blades which act on the air). In other embodiments, air mover 208 may comprise a blower (e.g., a centrifugal fan that employs rotating impellers to accelerate air received at its intake and change the direction of the airflow). In these and other embodiments, rotating and other moving components of air mover 208 may be driven by a motor. The rotational speed of the motor may be controlled by an air mover control signal communicated from a thermal control system of information handling system 202. In operation, air mover 208 may cool information handling resources of information handling system 202 by drawing cool air into an enclosure 200 housing the information handling resources from outside the chassis, expel warm air from inside the enclosure to the outside of such enclosure, and/or move air across one or more heat sinks (not explicitly shown) internal to the enclosure to cool one or more information handling resources.

Heat-rejecting media 222 may include any system, device, or apparatus configured to transfer heat from an information handling resource (e.g., processor 203, as shown in FIG. 2), thus reducing a temperature of the information handling resource. For example, heat-rejecting media 222 may include a solid thermally coupled to the information handling resource (e.g., heatpipe, heat spreader, heatsink, finstack, etc.) such that heat generated by the information handling resource is transferred from the information handling resource. In particular embodiments, heat-rejecting media 222 may comprise a cold plate through which cooling liquid may flow, such that heat may be transferred from an information handling resource (e.g., processor 203) to the cooling liquid via heat-rejecting media 222.

In operation, a cooled fluid may be received by cold manifold 228 from radiator 232B. Although not shown in FIG. 2 for purposes of clarity and exposition, in some embodiments, liquid-assisted air-cooled thermal control system 218 may include components for driving flow of the fluid (e.g., a pump). As the fluid passes through heat-rejecting media 222B proximate to a processor 203, heat may be transferred from the processor to heat-rejecting media 222B and from heat-rejecting media 222B to the fluid flowing within heat-rejecting media 222B, thus cooling the processor 203. Such heated fluid may then be discharged from a fluidic conduit 226 to radiator 232A.

As a result of airflow driven proximate to radiator 232A by air movers 208, the fluid may cool as it flows through radiator 232A (e.g., flowing from right to left in FIG. 2). The cooled fluid may then be conveyed to heat-rejecting media 222A via a fluidic conduit 226. As the fluid passes through heat-rejecting media 222A proximate to a processor 203, heat may be transferred from the processor to heat-rejecting media 222A and from heat-rejecting media 222A to the fluid flowing within heat-rejecting media 222A, thus cooling the processor 203. Such heated fluid may then be discharged from a fluidic conduit 226 to hot manifold 230, after which it may flow to radiator 232B.

As a result of airflow driven proximate to radiator 232B by air movers 208, the fluid may cool as it flows through radiator 232B (e.g., flowing from left to right in FIG. 2).

After cooling, the fluid may again flow to cold manifold 228, repeating the flow and cooling process.

In addition to processor 203, memory 204, and liquid-assisted air-cooled thermal control system 218, information handling system 202 may include one or more other information handling resources. Furthermore, for the sake of clarity and exposition of the present disclosure, FIG. 2 depicts information handling system 202 including a liquid-assisted air-cooled thermal control system 218 for cooling of processors 203. However, in some embodiments, approaches similar or identical to those used to cool processors 203 as described herein may be employed to provide cooling of any other information handling resources of information handling system 202.

Figure 1:
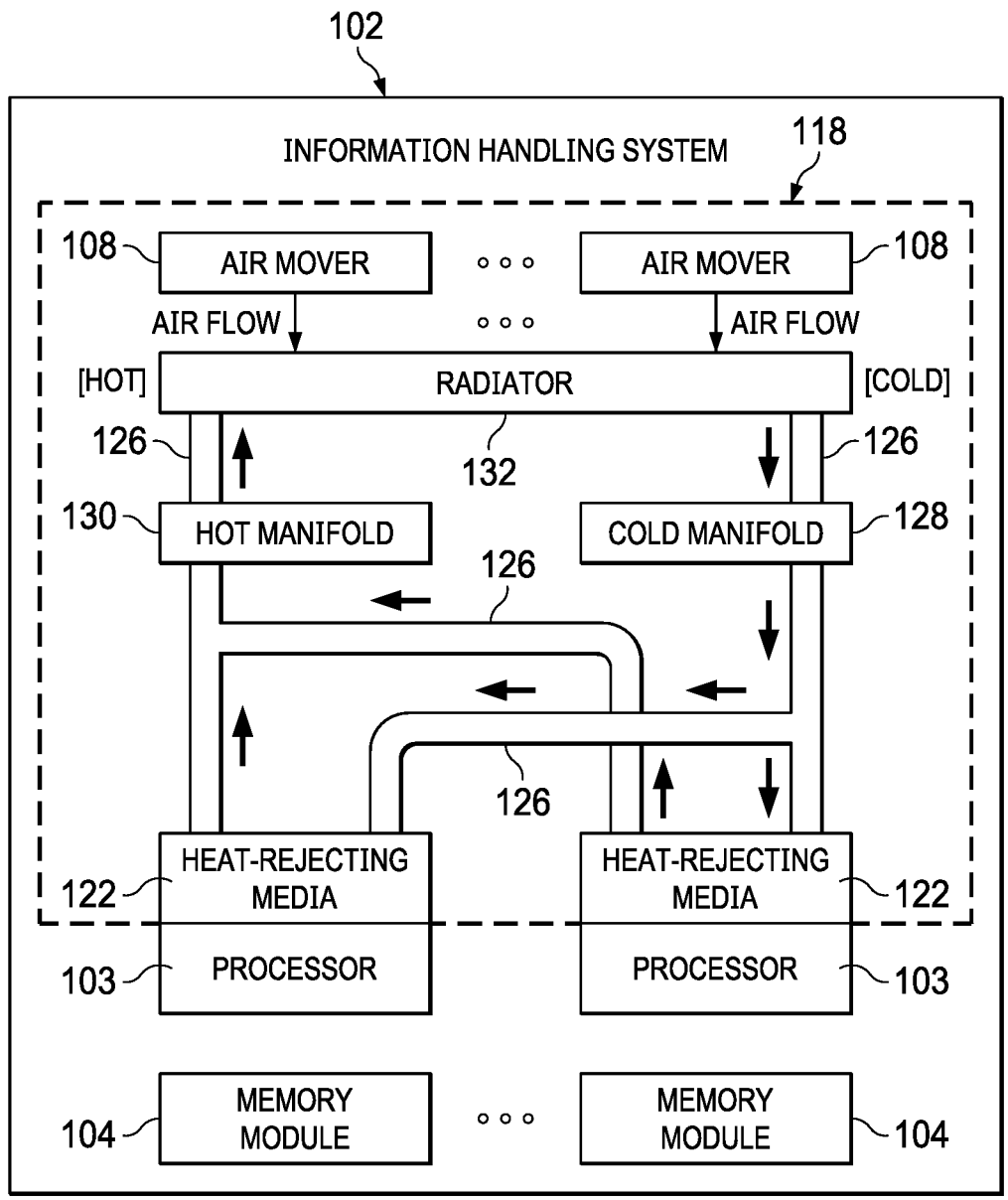
FIG. 1 illustrates a block diagram of an example information handling system, as is known in the art.

One notable difference between information handling system 202 depicted in FIG. 2 and information handling system 102 depicted in FIG. 1 is that radiators 232 and heat-rejecting media 222 are in a serial loop, as opposed to the parallel arrangement of heat-rejecting media 122. Another notable difference is that radiator 132 of FIG. 1 is effectively divided into two radiators 232A and 232B.

Because of a hot-to-cold temperature gradient from left to right in radiator 232A and an approximately mirrored hot-to-cold temperature gradient from right to left in radiator 232B, airflow driven by radiators 232A and 232B, once past radiators 232A and 232B, may be approximately uniform in temperature. Accordingly, the air flowing proximate to memory module 204 should be approximately uniform, potentially overcoming the disadvantages of the arrangement of FIG. 1.

In addition, routing of fluidic conduit networks for heat-rejecting media 222A and 222B may be approximately equal, potentially reducing or eliminating the mismatched cooling of processors 103 in the arrangement of FIG. 1.

Furthermore, the arrangement of FIG. 2 may not require use of three-way valves needed in the arrangement of FIG. 1, potentially reducing fluid routing complexity and improving reliability compared to the arrangement of FIG. 1.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a plurality of information handling resources comprising at least a first information handling resource and a second information handling resource; and
   a thermal control system comprising:
      one or more air movers;
      first heat-rejecting media thermally coupled to the first information handling resource, the first heat-rejecting media configured to receive a flow of cooling fluid through the first heat-rejecting media;
      second heat-rejecting media thermally coupled to the second information handling resource, the second heat-rejecting media configured to receive the flow of cooling fluid through the second heat-rejecting media;
      a first heat exchanger fluidically coupled to the first heat-rejecting media and located such that airflow driven by the one or more air movers flows proximate to the first heat exchanger; and
      a second heat exchanger fluidically coupled to the second heat-rejecting media and located such that airflow driven by the one or more air movers flows proximate to the second heat exchanger;
      wherein:
      components of the thermal control system are arranged such that the cooling fluid flows from the first heat exchanger to the first heat-rejecting media, from the first heat-rejecting media to the second heat exchanger, from the second heat exchanger to the second heat-rejecting media, and from the second heat-rejecting media to the first heat exchanger; and the first heat exchanger and the second heat exchanger are arranged relative to one another and relative to the one or more air movers such that as a result of mirrored thermal gradients across the first heat exchanger and the second heat exchanger, airflow driven by the one or more air movers proximate to the first heat exchanger and the second heat exchanger is of approximately uniform temperature once driven past the first heat exchanger and the second heat exchanger.

2. The information handling system of claim 1, wherein:
a first manifold is fluidically interfaced between the first heat exchanger and the first heat-rejecting media; and
a second manifold is fluidically interfaced between the second heat exchanger and the second heat-rejecting media.

3. The information handling system of claim 1, wherein:
the first heat exchanger comprises a first radiator; and
the second heat exchanger comprises a second radiator.

4. The information handling system of claim 1, wherein:
the first information handling resource comprises a first processor; and
the second information handling resource comprises a second processor.

5. The information handling system of claim 1, wherein:
the first heat-rejecting media comprises a first cold plate; and
the second heat-rejecting media comprises a second cold plate.

6. A thermal control system comprising:
first heat-rejecting media configured to thermally couple to a first information handling resource, the first heat-rejecting media further configured to receive a flow of cooling fluid through the first heat-rejecting media;
second heat-rejecting media configured to thermally couple to a second information handling resource, the second heat-rejecting media further configured to receive the flow of cooling fluid through the second heat-rejecting media;
a first heat exchanger fluidically coupled to the first heat-rejecting media and located such that airflow driven by one or more air movers flows proximate to the first heat exchanger; and
a second heat exchanger fluidically coupled to the second heat-rejecting media and located such that airflow driven by the one or more air movers flows proximate to the second heat exchanger;
wherein:
components of the thermal control system are arranged such that the cooling fluid flows from the first heat exchanger to the first heat-rejecting media, from the first heat-rejecting media to the second heat exchanger, from the second heat exchanger to the second heat-rejecting media, and from the second heat-rejecting media to the first heat exchanger; and
the first heat exchanger and the second heat exchanger are arranged relative to one another and relative to the one or more air movers such that as a result of mirrored thermal gradients across the first heat exchanger and the second heat exchanger, airflow driven by the one or more air movers proximate to the first heat exchanger and the second heat exchanger is of approximately uniform temperature once driven past the first heat exchanger and the second heat exchanger.

7. The thermal control system of claim 6, wherein:
a first manifold is fluidically interfaced between the first heat exchanger and the first heat-rejecting media; and
a second manifold is fluidically interfaced between the second heat exchanger and the second heat-rejecting media.

8. The thermal control system of claim 6, wherein:
the first heat exchanger comprises a first radiator; and
the second heat exchanger comprises a second radiator.

9. The thermal control system of claim 6, wherein:
the first information handling resource comprises a first processor; and
the second information handling resource comprises a second processor.

10. The thermal control system of claim 6, wherein:
the first heat-rejecting media comprises a first cold plate; and
the second heat-rejecting media comprises a second cold plate.

11. A method comprising:
fluidically coupling a first heat exchanger to first heat-rejecting media and locating the first heat exchanger such that airflow driven by one or more air movers flows proximate to the first heat exchanger, wherein the first heat-rejecting media is configured to thermally couple to a first information handling resource and is configured to receive a flow of cooling fluid through the first heat-rejecting media;
fluidically coupling a second heat exchanger to second heat-rejecting media and locating the second heat exchanger such that airflow driven by the one or more air movers flows proximate to the second heat exchanger, wherein the second heat-rejecting media is configured to thermally couple to the a second information handling resource and is configured to receive a flow of cooling fluid through the second heat-rejecting media;
arranging components of a thermal control system such that the cooling fluid flows from the first heat exchanger to the first heat-rejecting media, from the first heat-rejecting media to the second heat exchanger, from the second heat exchanger to the second heat-rejecting media, and from the second heat-rejecting media to the first heat exchanger; and
arranging the first heat exchanger and the second heat exchanger relative to one another and relative to the one or more air movers such that as a result of mirrored thermal gradients across the first heat exchanger and the second heat exchanger, airflow driven by the one or more air movers proximate to the first heat exchanger and the second heat exchanger is of approximately uniform temperature once driven past the first heat exchanger and the second heat exchanger.

12. The method of claim 11, wherein:
fluidically interfacing a first manifold between the first heat exchanger and the first heat-rejecting media; and
fluidically interfacing a second manifold is between the second heat exchanger and the second heat-rejecting media.

13. The method of claim 11, wherein:
the first heat exchanger comprises a first radiator; and
the second heat exchanger comprises a second radiator.

14. The method of claim 11, wherein:
the first information handling resource comprises a first processor; and
the second information handling resource comprises a second processor.

15. The method of claim 11, wherein:
the first heat-rejecting media comprises a first cold plate; and the second heat-rejecting media comprises a second cold plate.

\* \* \* \* \*